(12) United States Patent
Lauze (10) Patent No.: US 10,645,867 B1
(45) Date of Patent: May 12, 2020

(54) SPREADER DEVICE

(71) Applicant: Normand Lauze, Topsham, ME (US)

(72) Inventor: Normand Lauze, Topsham, ME (US)

( * ) Notice: Subject to any disclaimer, the term of this patent is extended or adjusted under 35 U.S.C. 154(b) by 0 days.

(21) Appl. No.: 16/565,842

(22) Filed: Sep. 10, 2019

Related U.S. Application Data (60) Provisional application No. 62/822,140, filed on Mar. 22, 2019.

(51) Int. Cl.
  *A01C 15/12* (2006.01)
  *A01C 15/00* (2006.01)
(52) U.S. Cl.
  CPC ............ *A01C 15/12* (2013.01); *A01C 15/003* (2013.01); *A01C 15/006* (2013.01)
(58) Field of Classification Search
  CPC ..... A01C 15/12; A01C 15/124; A01C 15/003; A01C 15/005

USPC ......................................... 239/672, 671, 676
See application file for complete search history.

(56) References Cited

U.S. PATENT DOCUMENTS

| | | | | |
|---|---|---|---|---|
| 5,172,645 A | * | 12/1992 | Billett .................. | A01C 15/124 111/170 |
| 5,570,656 A | * | 11/1996 | Waldner ............... | A01K 5/0225 119/53 |

FOREIGN PATENT DOCUMENTS

FR  3059204 A1 * 6/2018 ............... A01C 3/06

* cited by examiner

*Primary Examiner* — Jason J Boeckmann
(74) *Attorney, Agent, or Firm* — Jeffrey Joyce, Esq.

(57) ABSTRACT

A spreader device for distributing agricultural materials over a defined delivery path, the device including a container for holding the materials atop a conveyor system that distributes the material over a delivery path that is adjustable in width. In the primary embodiment the container includes telescopically adjustable sidewalls that enable a user to control the width of the delivery path.

10 Claims, 15 Drawing Sheets

SPREADER DEVICE

FIELD OF THE INVENTION

This disclosure relates to spreaders and, particularly, to spreaders that are used to dispense such things as organic compost, fertilizers, mulch and seed, and more particularly to those types of spreaders that are used in large scale agricultural settings.

BACKGROUND

In large scale agricultural settings, such as farms covering hundreds of acres, large tractors are used to routinely cover newly planted seeds and seedlings with fertilizer and mulch. Typically, seeds are planted in rows that are separated by bare ground over which the tractors wheels travel while dispensing the fertilizer and mulch. The rows of seedlings typically vary in width between as little as 16 inches and as much as 72 inches. The tractor wheels typically span the planted area with one tire on each side, such that the mulch or fertilizer is best deployed immediately beneath some portion of the tractor.

However, conventional dispensing systems use a type of spraying system or fanning system to deploy the fertilizer and/or mulch in a wide circular pattern. These devices adequately cover the seeded area, however, they also deploy fertilizer and mulch outside of the seeded area and in particular into the unseeded tires paths, thus wasting a significant amount of product during each application.

What is needed, therefore, is a spreader device that spreads a deliverable substance over a specific area without also covering unintended and unwanted areas.

BRIEF SUMMARY OF THE INVENTION

The spreader device according to the invention is designed to spread agricultural materials such as organic compost, chicken manure pellets, and other fertilizers. The device includes a conveyor that may be powered by a host unit hydraulic system, and a container with telescopic side plates that allows material to be fed with selectively varying path widths. For example, the path width may vary between 16 inches to 72 inches for a single unit depending on the width of the planted row. The device may be mounted on a mounting frame that is designed for conventional category 2 or category 3 hitch receivers so that it may be affixed to the rear of a conventional tractor without having to modify the tractor.

Once the spreader device is mounted on a tractor the tractor is driven over a row, with its tires on either side of the row, with the telescopic sides adjusted for the width of the row, and the conveyor deploys seed precisely over the row. Depending on the size of the farm, deploying the agricultural materials only in the areas where they are needed as opposed to where they are wasted may save thousands of dollars annually. In some embodiments, a mounting frame may be constructed that is able to hold multiple spreader devices to cover a larger area, e.g. three spreader devices may be attached to the rear of the tractor such that the one in the middle covers the row over which the tractor is driving while the spreaders on the side cover the rows to the left and right of the tractor.

The telescopic side plates may be constructed in a manually or automatically adjustable manner. In one embodiment, the telescopic side plates are adjustable by individual jacks, such as screw jacks that have a 15 inch travel span. The jack is manually cranked to extend or retract the screw, which is attached to a single hinge point on a lower end of the side plate, with the side plate riding along a track that is attached to end plates of the container. In a preferred embodiment, the device is made of 304 stainless steel, with the conveyor comprising a stainless steel flat wire belt.

DETAILED DESCRIPTION

The present technology will now be described more fully in detail and with reference to the accompanying drawings, in which select embodiments of the present disclosure are shown. This disclosure should not, however, be construed as limited to the particular embodiments set forth herein or illustrated in the accompanying drawings; rather, the embodiments discussed herein are provided so that this disclosure will fully convey the scope of the presently disclosed technology to those skilled in the art.

Figure 23:
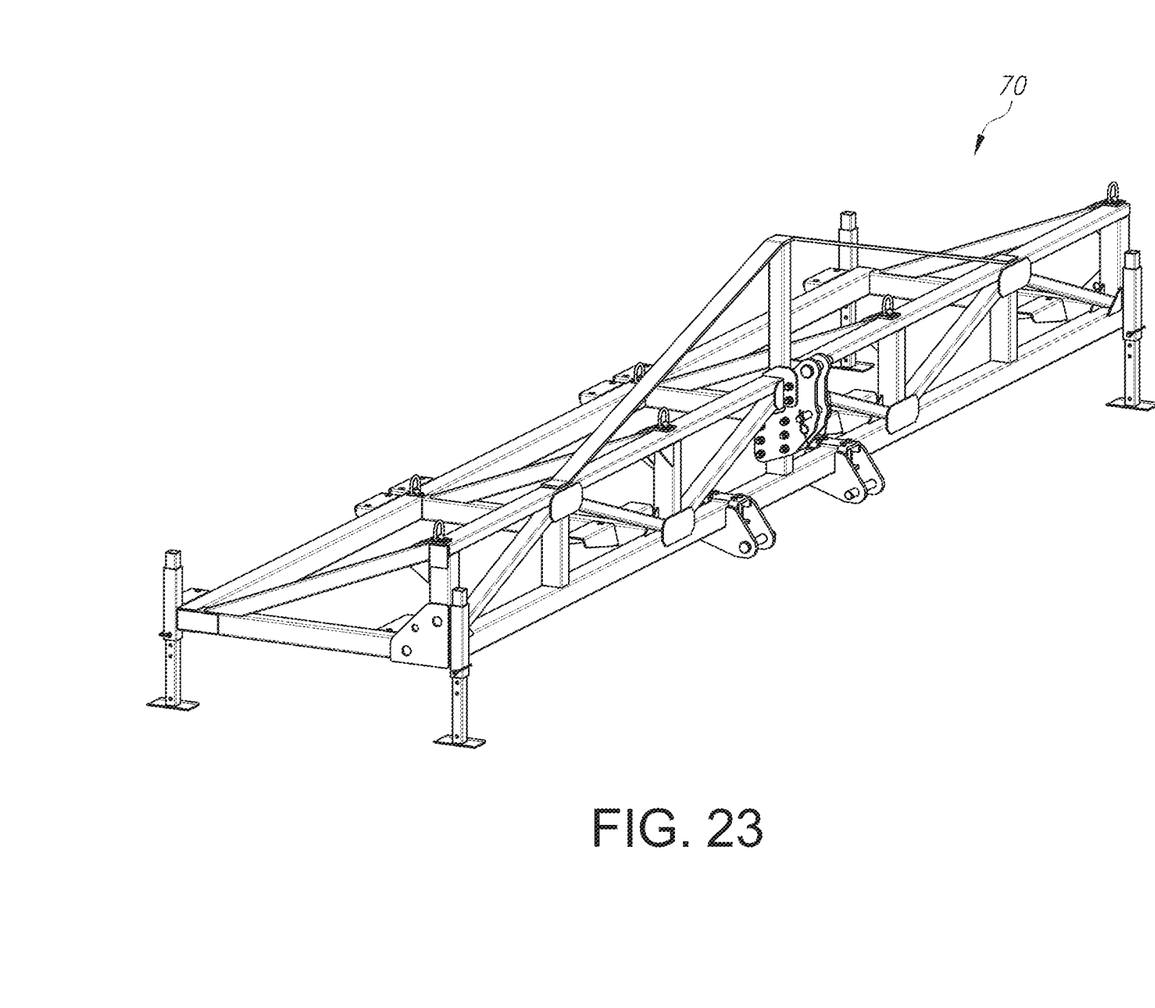
FIG. 23 is perspective view of one embodiment of the mounting frame.

FIGS. 1-22 illustrate a spreader device 100 according to the invention, including a container 10 positioned atop a conveyor assembly 50. The container 10, best shown in FIGS. 1-7, has a front end wall 12 having a gate 13 that is able to open and close so as to keep the deliverable materials safely secured inside the container 10 while in transit and to allow them to exit the container 10 on the conveyor assembly 50 when the device 100 is in the desired location and in use. In operation the device 100 is mounted on a mounting frame 70, and example of which is shown in FIG. 23, that is then connected in a conventional manner to a conventional vehicle, such as a tractor, and used to disperse compost, chicken manure pellets, fertilizer, powders, mulch, seed, and other agricultural materials over a desired, and contained, area, namely, immediately beneath the conveyor assembly 50 in a path that is approximately no wider than the width of the conveyor assembly.

The gate 13 is controllable by conventional devices 15 that may be manual or automated, for example, screwjacks or sidewind jacks may be used to open or close the gate. The container 10 also includes a rear end wall 14 and a pair of sidewalls 16. In one embodiment, best shown in FIGS. 7, 8 and 11-14, the sidewalls are telescopic and include an upper plate 18 and a lower plate 22, with the lower plate having a number of vertically aligned insertion slots 24 and the upper plate 18 having securing means 26 that are slideably attached in the insertion slots so as to slideably couple the plates together. A sheet, for example a sheet of high density polyethylene, may be inserted between the two plates 18, 22 for wear resistance.

Figure 1:
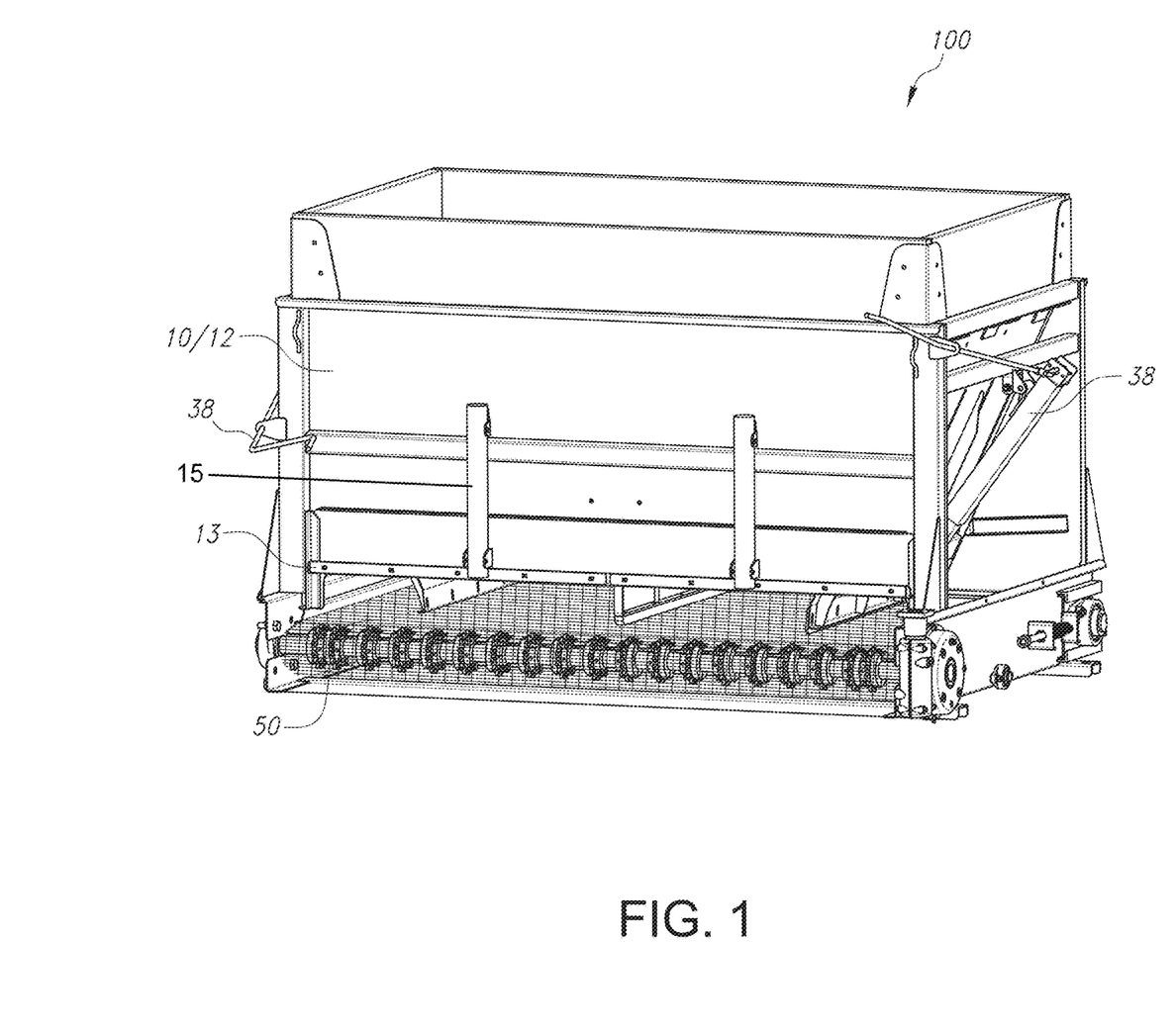
FIG. 1 shows a front perspective view of the spreader device according to the invention.
Figure 2:
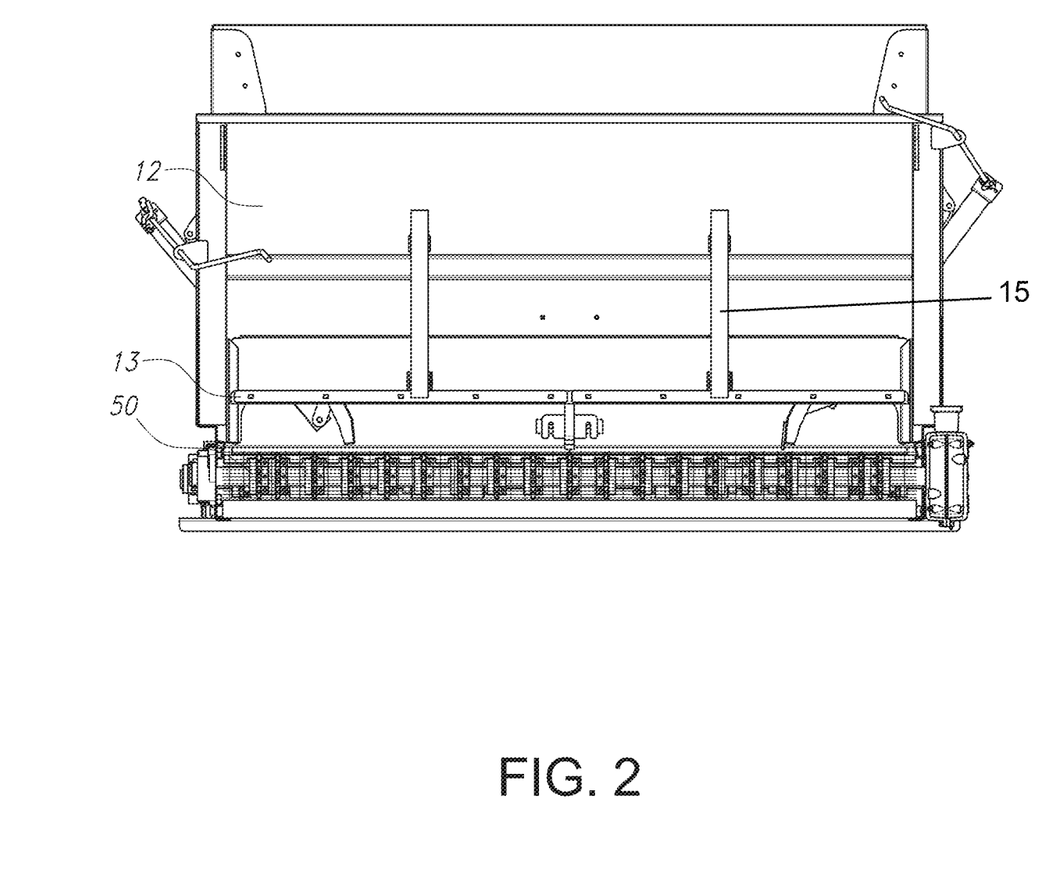
FIG. 2 shows a front view of the device.
Figure 3:
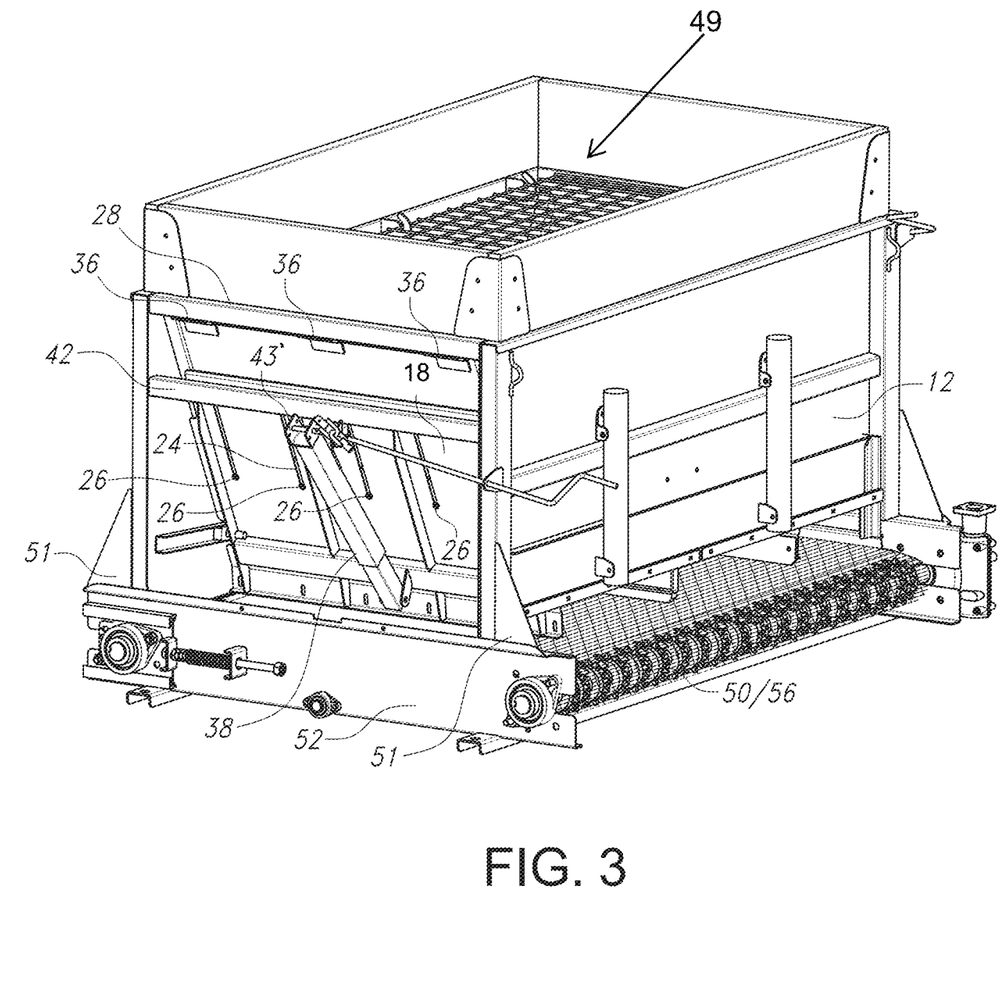
FIG. 3 shows a close up side and front perspective view.
Figure 4:
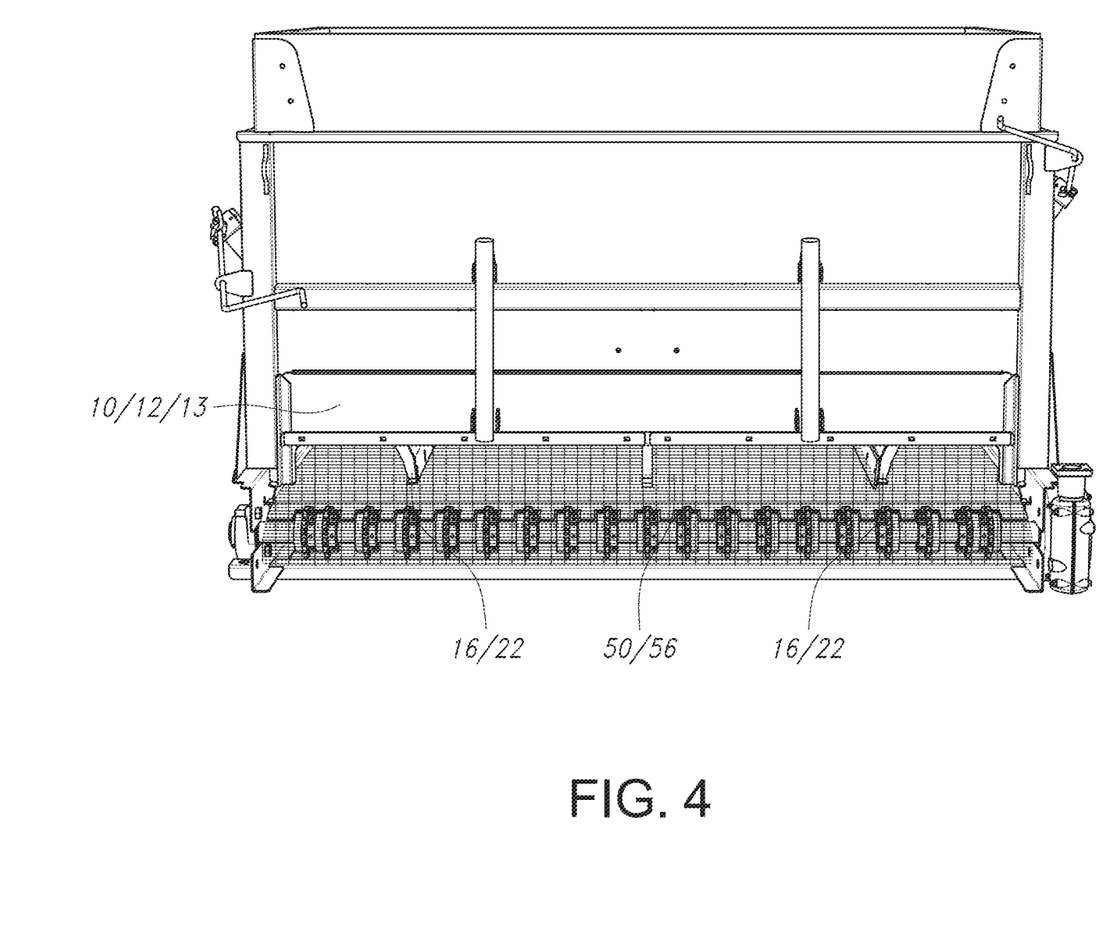
FIG. 4 shows a close up view of a portion of the front of the device.
Figure 5:
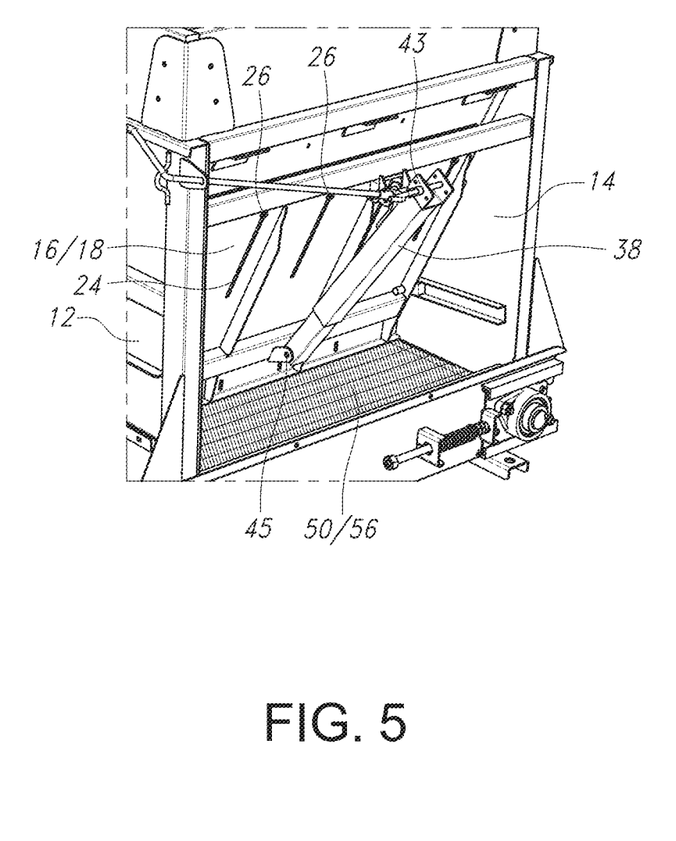
FIG. 5 is a side view of the device with the telescoping sidewall in an inward position.
Figure 6:
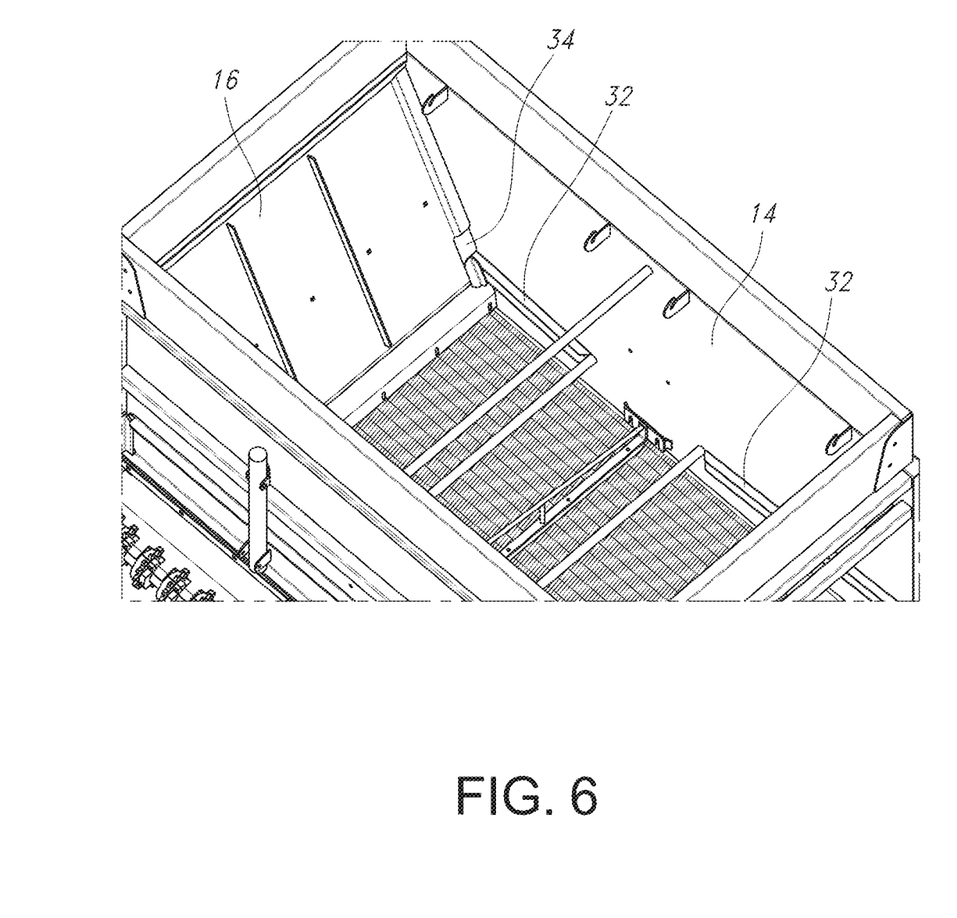
FIG. 6 is a top view of the device with one telescoping sidewall in an inward position and the other sidewall in a vertical non-adjusted position.
Figure 7:
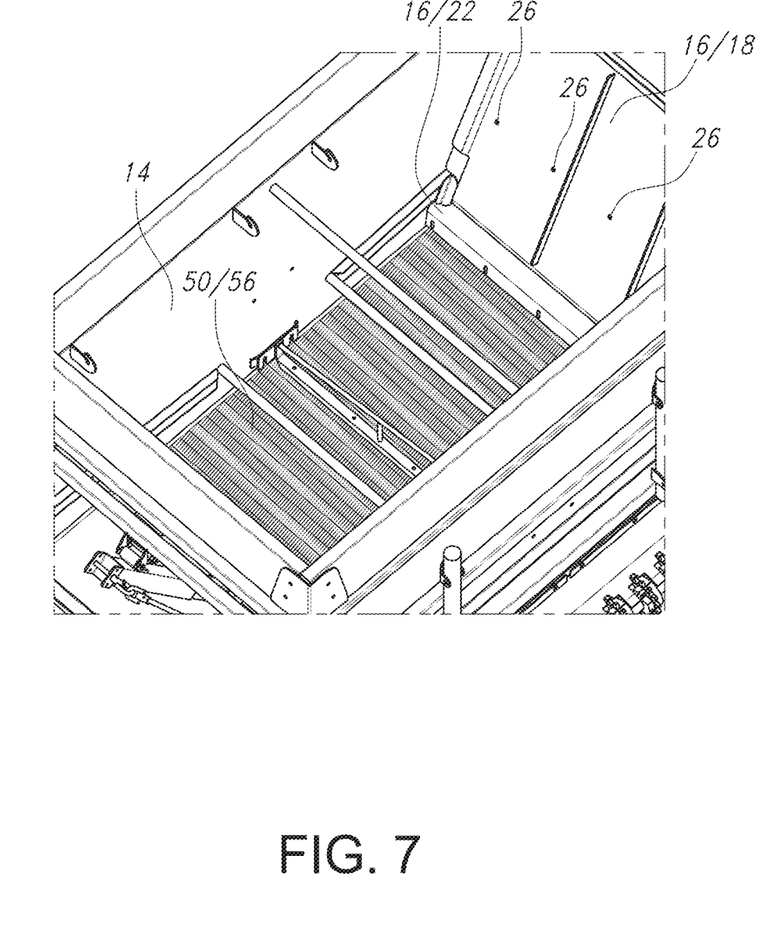
FIG. 7 is a top view of the device showing both sidewalls in an inward position.
Figure 8:
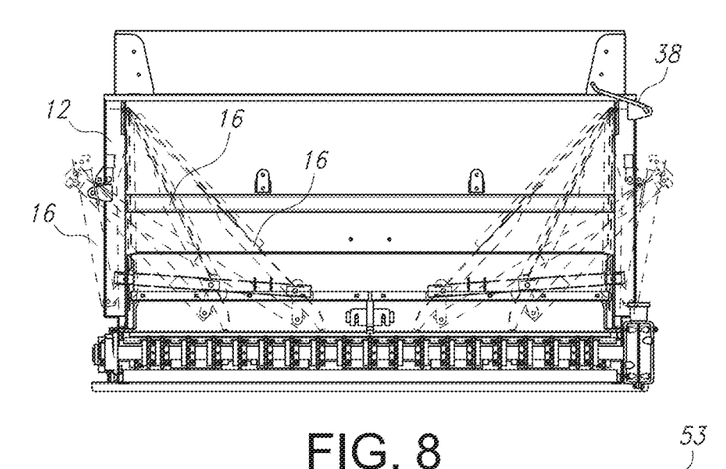
FIG. 8 is a front cross-sectional view illustrating the telescoping sidewalls in various positions.
Figure 9:
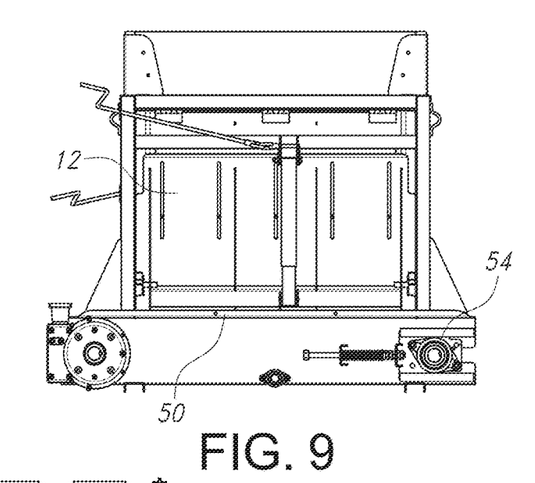
FIG. 9 is a front view of the device showing the front of the conveyor assembly drive system.
Figure 10:
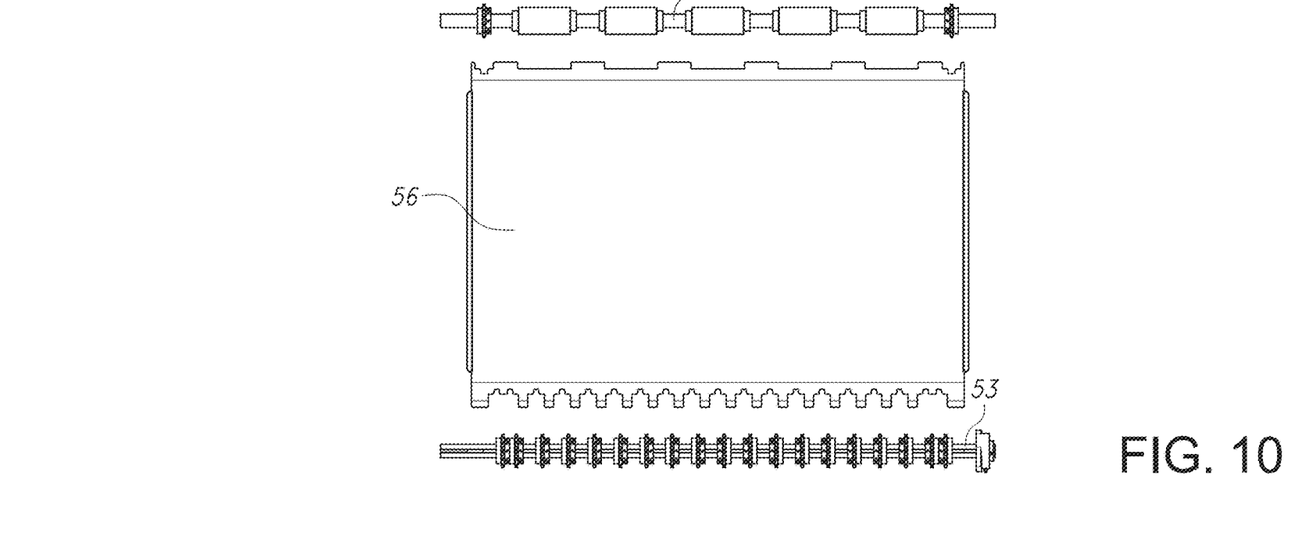
FIG. 10 is a top view of the conveyor assembly.
Figure 11:
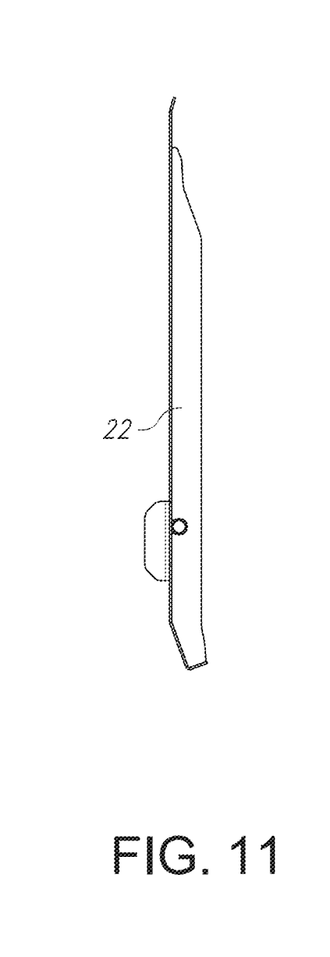
FIG. 11 is a side view of the sidewalls lower plate.
Figure 12:
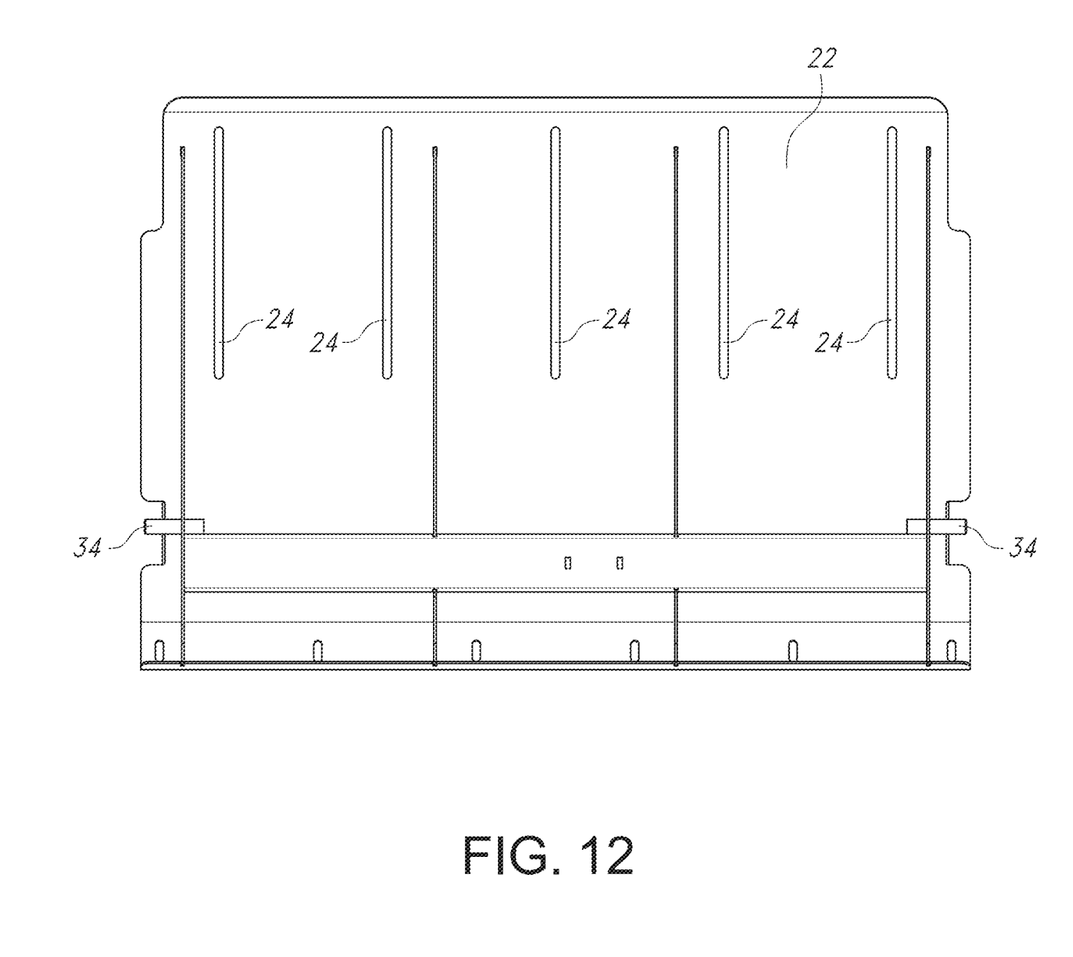
FIG. 12 is a front view of the sidewalls lower plate.
Figure 13:
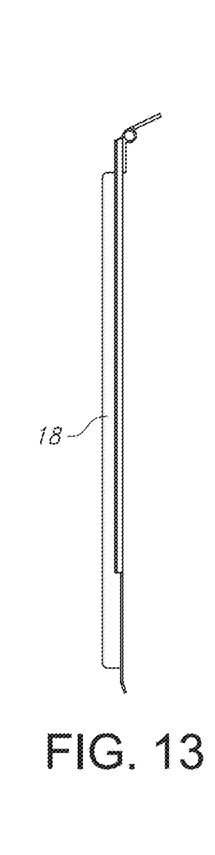
FIG. 13 is a side view of the sidewalls upper plate.
Figure 14:
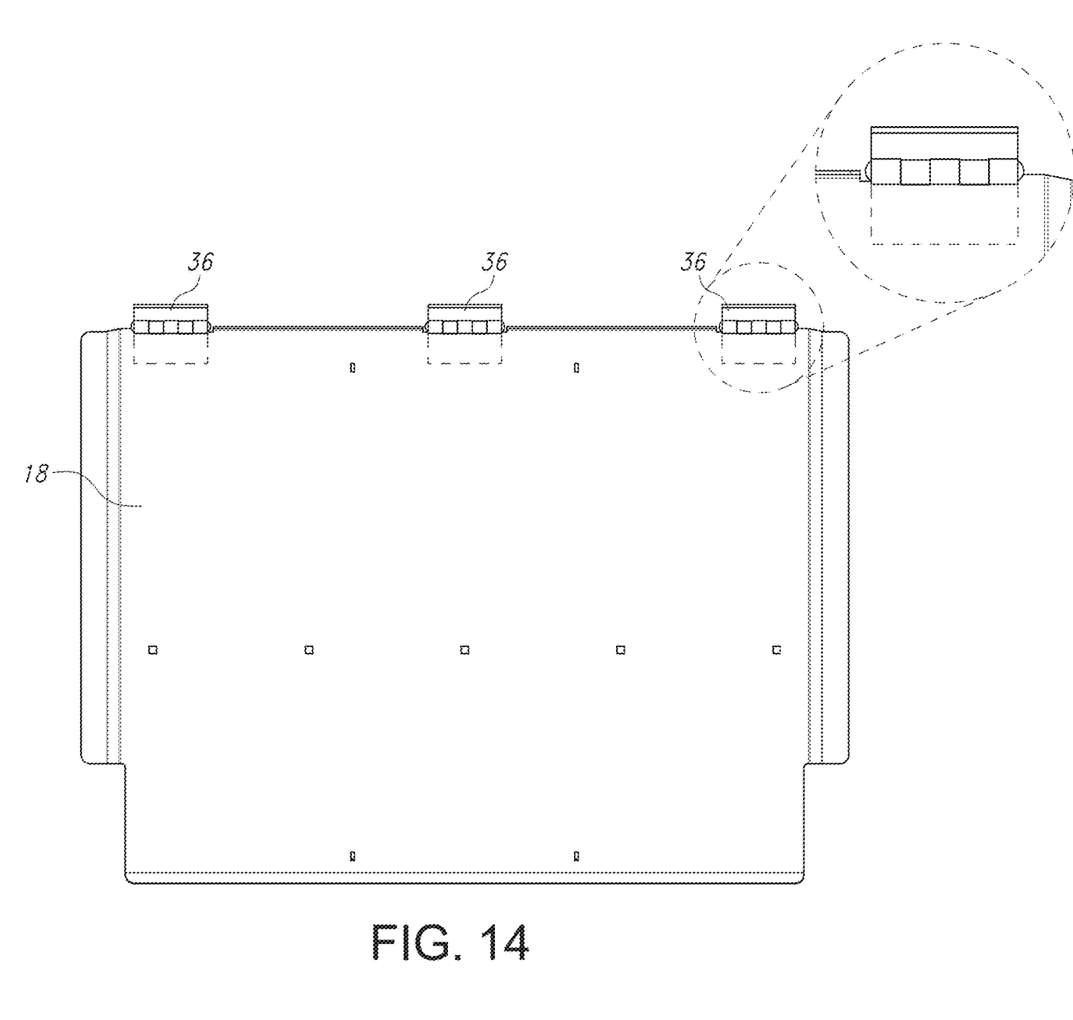
FIG. 14 is a front view of the sidewalls upper plate.
Figure 15:
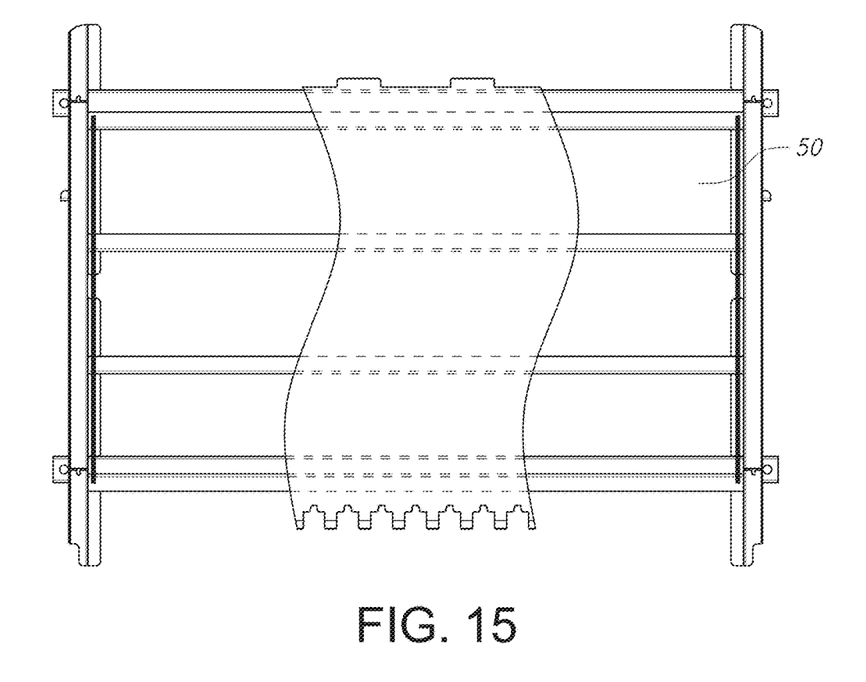
FIG. 15 is a top view of the conveyor assembly.
Figure 16:
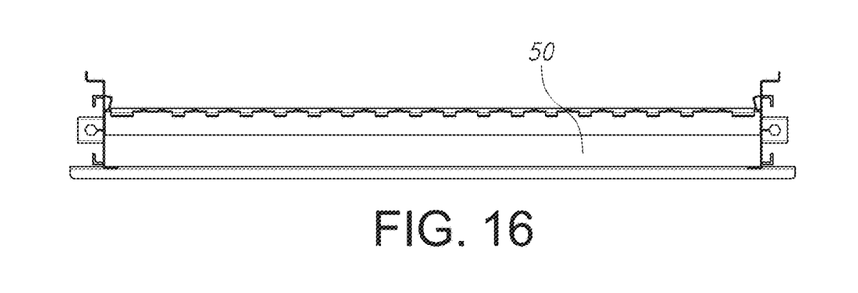
FIG. 16 is a side view of the conveyor assembly.
Figure 17:
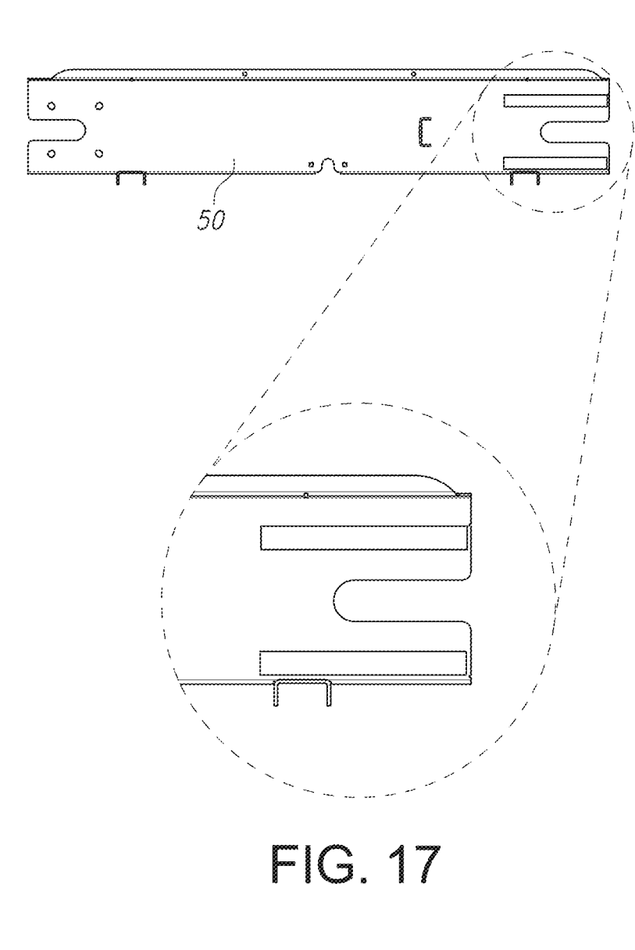
FIG. 17 is a front view of the conveyor assembly.
Figure 18:
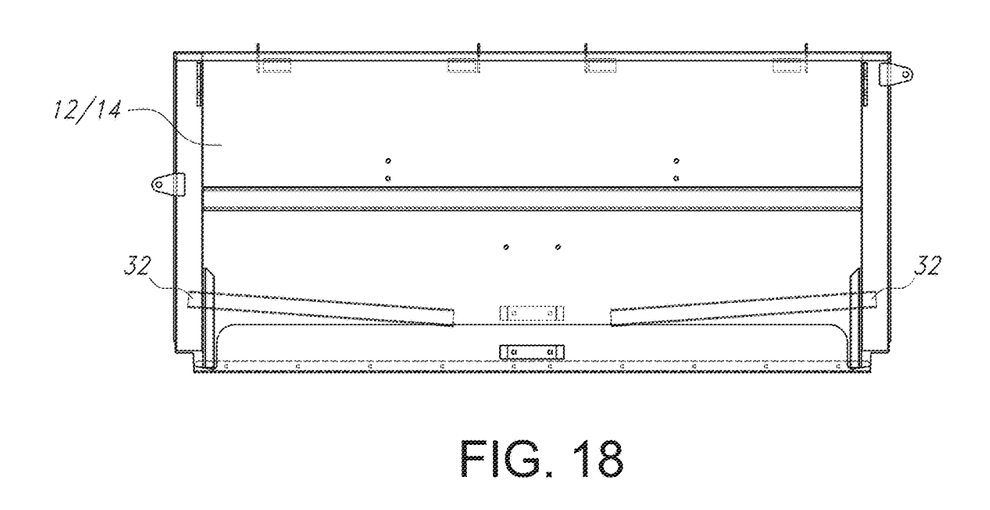
FIG. 18 is an internal view of the end walls showing the sidewalls guide rail or guide channel.
Figure 19:
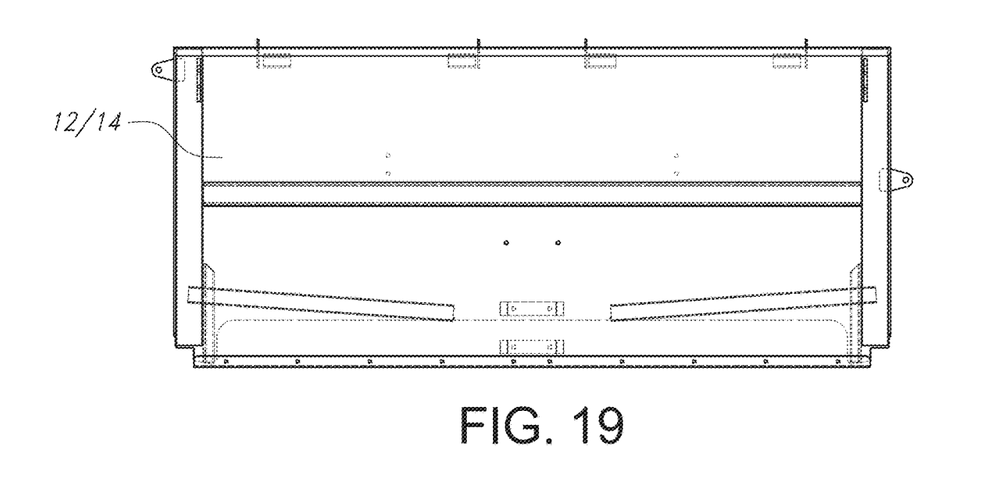
FIG. 19 is an outside view of the end walls.
Figure 20:
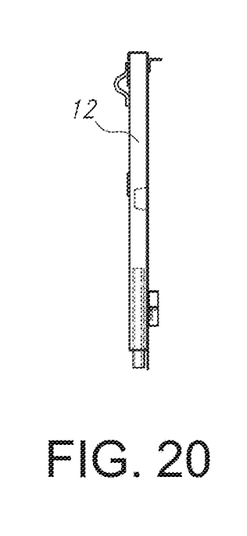
FIG. 20 is a left side view of the front end wall.
Figure 21:
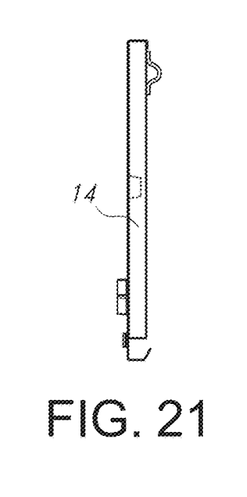
FIG. 21 is a right side view of the rear end plate.
Figure 22:
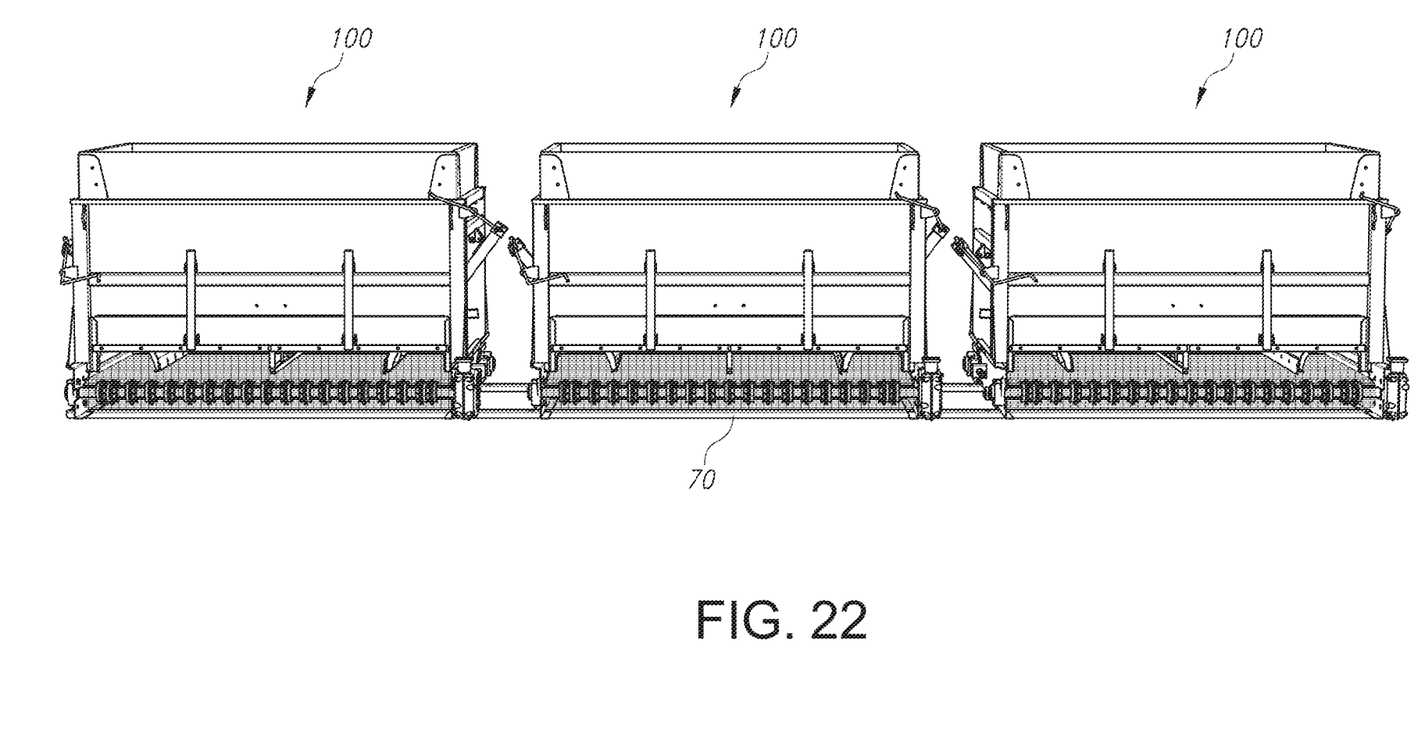
FIG. 22 is a front view of an embodiment of the device where three spreaders are attached to a single mounting frame.

The front end wall 12 and rear end wall 14 are each affixed to the top sides of the conveyor assembly 50 at attachment points 51, shown in FIG. 3. A cross bar or tube 28 is attached to the tops of each end wall 12, 14. The interior portions of the front end wall 12 and rear end wall 14 each have guide rails 32, best shown in FIG. 6. The side walls 16 each have insertion slots 34 that work in connection with guide rails 32 as the sidewalls 16 telescopically move inside the container 10. The side walls 16 are pivotably attached to the cross bar 28 using conventional means such as, for example, leaf hinges 36.

Adjustment mechanisms 38, shown in FIG. 3, are provided to adjust the bottom position of the sidewalls 16 inwards towards the center of the container along the guide rails 32. As the bottom portions of the sidewalls 16 are pushed inwards the lower plate 22 extends. In the embodiment shown, cross bars 42 are attached to the outer ends of the end walls 12, 14. There are a number of suitable adjustment mechanisms, such as, for example, screw or sidewind jacks. In the example of the sidewind jack, an upper end of the jack is affixed near a midpoint 43 on the cross bar 42 and a lower end of the jack is affixed to a low position 45 on the sidewall 16. The adjustment mechanism may be manually adjusted such that lower plates 22 on the sidewalls 16 slide in or out along the guide rails 32 depending on the direction of the jack rotation. Depending on the position of the lower plates 22 the path of deployment of the deliverable materials is narrowed or widened.

The conveyor assembly 50, best shown in FIGS. 1, 4, 10, and 15-17, includes a base 52 that encloses a plurality of conveyor rails 53 that are operated by a drive system 54 and around which a conventional conveyor belt 56 runs. The conveyor rails 53 may, for example, include a drive shaft having a plurality of sprockets that is connected to the drive system and a tail shaft that also has a plurality of sprockets. The conveyor belt 56 may be any suitable belt, such as, for example, a stainless steel flat wire belting. The drive system 54 may be any suitable conventional system, such as a hydraulic drive system connected to a gear box that drives the rail. In the example of a hydraulic system, the drive system 54 on the spreader device 100 would be connected to and controlled by a hydraulic pump conventionally provided by the host vehicle.

The mounting frame 70, shown in FIG. 23, is, generally, a strong structure generally in the shape of container, such that the container may be placed upon and affixed to an upper side of the frame 70. As previously noted, the mounting frame 70 has a hitch that is connectable with a conventional hitch receiver on a tractor, for example, it may be suitable for use with category 2 and/or category 3 hitches.

In general, and without any telescoping effects, the walls 12, 14, 16, are arranged roughly in the shape of a square or rectangle and positioned above or on top of the conveyor assembly 50. The container has an open top and an open bottom such that a deliverable substance may be inserted from above and placed on the conveyor assembly 50, bounded on all sides by the container 10. A screen 49 having a relatively wide mesh may be placed on the top of the container to prevent larger rocks and debris from entering the container along with the deliverable substance.

It is understood that the embodiments described herein are merely illustrative. Variations in the construction of the spreader device may be contemplated by one skilled in the art without limiting the intended scope of the present disclosure, and as defined by the following claims.

What is claimed is:

1. A spreader device for spreading deliverable materials over a delivery path, the spreader device comprising:
   a container and a conveyor assembly, the container positioned above the conveyor assembly;
   wherein the container includes a front end wall, a rear end wall, a first sidewall and a second sidewall, and wherein the top and bottom of the container are both at least partially open;
   wherein at least one of the first sidewall and second sidewall is an adjustable sidewall such that a lower end of the adjustable sidewall may move inwards or outwards relative to the center of the conveyor assembly so as to narrow or widen the delivery path;
   wherein the at least one adjustable sidewall includes an upper plate and a lower plate that overlap and are slidably coupled to one another, and wherein as the adjustable sidewall is adjusted inward the lower plate extends downward along the upper plate towards the middle of the conveyor assembly;
   wherein the lower plate has one or more vertically aligned slots and the upper plate has a number of protrusions that are slidably secured in the vertically aligned slots;
   wherein the deliverable materials are placed atop the conveyor assembly and contained within the container; and
   wherein the conveyor assembly spreads the deliverable materials beneath the conveyor assembly in a path that is approximately no wider than the width of the conveyor assembly.

2. The spreader device of claim 1, wherein a sheet is inserted between the lower plate and upper plate.

3. The spreader device of claim 1, wherein interior portions of the front end wall and the rear end wall each have guide rails and the one or more adjustable sidewalls have insertion slots that are positioned in and slide along the guide rails as the adjustable sidewalls are adjusted.

4. The spreader device of claim 1, further comprising at least one adjustment device that controls the movement of the at least one adjustable sidewall.

5. The spreader device of claim 4, wherein the adjustment device includes a jack that has an upper end that is affixed to the adjustable sidewall and pushes or pulls the lower end of the adjustable sidewall depending on the direction of movement of the jack.

6. The spreader device of claim 5, further including a cross bar that extends along the side of the container and is affixed on one end to the front end wall and on another end to the rear end wall, and wherein an upper end of the adjustment device is pivotably affixed to the cross bar.

7. The spreader device of claim 1, wherein the conveyor assembly includes conveyor belt that is controlled by a drive system.

8. The spreader device of claim 1, wherein the front end wall includes an openable gate.

9. The spreader device of claim 1, wherein the container and conveyor assembly are affixed to a mounting frame, the mounting frame being attachable to a delivery vehicle.

10. The spreader device of claim 1, further including at least a second container positioned above a second conveyor assembly and a third container positioned above a third conveyor assembly, each of the containers and conveyor assemblies affixed to a mounting frame that is attachable to a delivery vehicle.

\* \* \* \* \*